R. HURLEY.
STORAGE BATTERY.
APPLICATION FILED DEC. 28, 1912.

1,138,220.

Patented May 4, 1915.

Witnesses:
Hyperion Barry.
F. George Barry.

Inventor:
Richard Hurley
by his attorneys
Brown Seward

UNITED STATES PATENT OFFICE.

RICHARD HURLEY, OF HOBOKEN, NEW JERSEY, ASSIGNOR TO JOHN C. FARR, JR., OF HOBOKEN, NEW JERSEY.

STORAGE BATTERY.

1,138,220.        Specification of Letters Patent.        Patented May 4, 1915.

Application filed December 28, 1912. Serial No. 739,060.

*To all whom it may concern:*

Be it known that I, RICHARD HURLEY, a subject of the Crown of Great Britain, and resident of Hoboken, in the county of Hudson and State of New Jersey, have invented a new and useful Improvement in Storage Batteries, of which the following is a specification.

This invention relates to a storage battery and more particularly to the type of storage battery known as the lead zinc battery.

The object is to provide a battery of this character which has, among others, the following advantages: a very high voltage for its size, light weight in proportion to its efficiency, economical construction, long life, a rapid charging rate, absence of "buckling," and absence of the formation of sulfate of lead on the plates.

The invention comprises in general a vessel having a metallic shell, composed of copper or other suitable material, and a lead plate positioned within the said vessel; and in the preferred form, the battery has a pair of metallic vessels one within the other, with a lead plate located in the inner vessel. The invention also contemplates the use of special electrolytes in the vessels.

Figure 1:
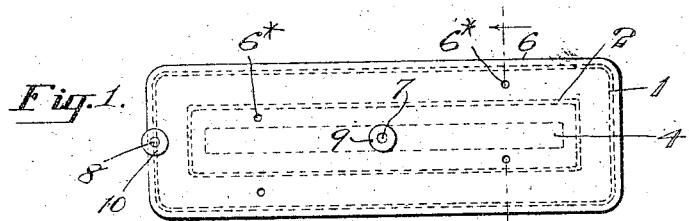
Figure 2:
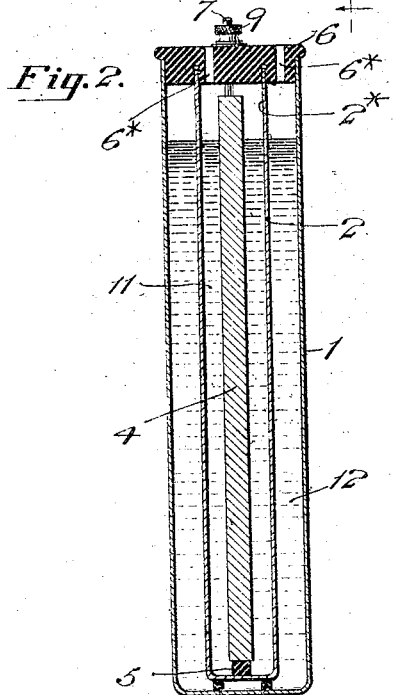
Figure 3:
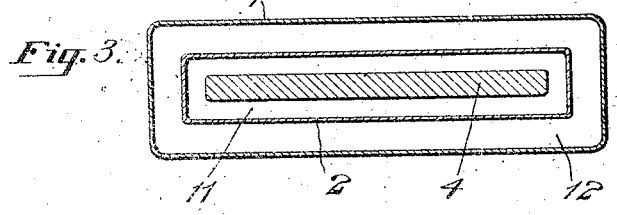

A practical embodiment of the invention is represented in the accompanying drawings, in which, Figure 1 represents a top plan view of the battery; Fig. 2 a vertical central section therethrough, and Fig. 3 a horizontal central section therethrough.

The outer vessel or shell of the battery is denoted by 1, and may be composed of sheet copper or zinc or other material having good conductivity and capable of receiving a negative coating. This shell may be conveniently made oblong in cross section and somewhat higher than it is wide, though the particular shape is not a matter of importance.

Within the shell 1 is located a similarly shaped but smaller vessel 2, which is supported out of contact with the shell 1, by insulating blocks 3 mounted on the bottom of the shell 1. These insulating blocks 3, may conveniently be composed of perforated rubber or other suitable insulating material.

The inner vessel 2 may be composed of copper or other material having like characteristics in this field of use, but I prefer to form it of sheet copper of substantially the same thickness as the outer shell 1, for the reason that copper is a good conductor. The entire inner surface of the vessel 2 is coated with mercury, denoted by 2*.

Within the vessel 2 is positioned a slab or plate of lead 4, which is, in turn, supported out of contact with the vessel 2, by an insulating block 5, mounted on the bottom of the inner vessel 2. This insulating block 5 may be composed of the same material as the blocks 3.

A suitable closure 6, composed of rubber or other insulating material, is arranged to cover the tops of the outer shell 1 and inner vessel 2, and is provided with suitable binding posts 7 and 8, in electric contact respectively with the lead plate 4 and the outer shell 1. These binding posts may be provided with the customary thumb nuts 9 and 10 for securing the wires thereto. The closure 6 is provided with suitable vents 6* for the escape of gas.

The shell 1 and inner vessel 2 are filled with electrolyte, and in my preferred form of battery, the electrolyte used in the shell 1, differs somewhat from the electrolyte used in the vessel 2.

The electrolyte 11 used in the shell 2 is formed as follows; (proportions being given for the purpose of illustration): One ounce of acetate of lead is dissolved in two pints of water to form a milky solution, and ten ounces of zinc dust are added to this solution, the mixture being stirred until the lead has been precipitated, leaving a clear solution thereabove. This supernatant is then poured off and the precipitate is dried and washed until no acetate of lead remains. In carrying out the above steps, some of the zinc will go into solution and the remainder will be in the form of small particles mixed with the lead. The lead and zinc in the deposit will be in the form of metals. The amount of zinc which goes into solution will be approximately equivalent to the amount of acetate of lead which was in the milky solution. I am aware that lead is not soluble to dilute sulfuric acid, but the fact is that the precipitate which consists of the lead and zinc combined in metallic form is soluble in dilute sulfuric acid, and I attribute this solubility to an electrolytic action due to the difference in the potential of the lead and zinc. The precipitate is then dissolved in dilute sulfuric acid of about twenty per cent. strength and allowed to stand until the whole is converted into crystals. I believe these crystals consist predominantly of some combination of lead sulfate and zinc sulfate. It is true that lead sulfate is not soluble in dilute sulfuric acid, but these crystals are, as a matter of fact, soluble in dilute sulfuric acid, and having been so dissolved, an electrolyte is formed which includes sulfate of lead, sulfate of zinc, and sulfuric acid. This conversion will be effected in about forty-eight hours at normal temperatures, but the time can be shortened to about twenty-four hours by heating the solution to say 200° F. These crystals are then dissolved in dilute sulfuric acid of about twenty per cent. strength, sufficient sulfuric acid being added to form with the crystals, a saturated solution.

The electrolyte which is used in the outer shell 1 is formed as follows; (proportions being given for purposes of illustration): About one ounce of metallic mercury is dissolved in about six ounces of nitric acid, and to this solution is added sulfate of zinc crystals until the latter become thoroughly saturated, forming a thick paste. This paste is deliquescent, and is allowed to stand exposed to the atmosphere until it becomes liquid, which will be in about twenty four hours. This liquid is added to the kind of electrolyte described above for use in the vessel 2, in the proportions of about one ounce of this last described solution to a pint of the electrolyte like that used in the vessel 2, the resulting mixture forming the electrolyte used in the outer shell 1. This electrolyte is denoted in the drawings by 12.

In making the electrolytes, I prefer that all ingredients used shall be chemically pure and that the water shall be distilled.

The appropriate electrolytes having been placed in the shell 1 and vessel 2, up to substantially the level indicated in Fig. 2 of the drawings, the battery may be charged for use in the ordinary manner, and during the period of charging, the inner surface of the vessel 2 will be coated with zinc amalgam; while mercury will be present on the outer surface of the vessel 2. The inner surface of the shell 1 will be coated with zinc amalgam; while the outer surface of the shell 1 will not be affected. I am aware that mercury is a negatively acting material, but, nevertheless, it is a fact that the outer surface of the inner shell retains its positive character.

It will be seen from the above that the battery is extremely simple in its construction, and the employment of an outer metallic shell (which I believe to be entirely novel in a storage battery), enables a surprising increase in voltage, without anything like a corresponding increase in weight.

It will be understood that various changes may be resorted to in the form, construction and arrangement of the several parts without departing from the spirit and scope of my invention, and I desire to be understood as claiming the battery to be new independently of the particular character of the electrolytes used.

What I claim is:

1. A storage battery having a double shell, the inner surface of the outer shell being of zinc amalgam and constituting a negative electrode; the outer surface of the inner shell being of copper amalgam and constituting a positive electrode; the inner surface of the inner shell being of zinc amalgam and constituting a negative electrode; and a lead plate located within the inner shell and constituting a positive electrode.

2. A storage battery having a double shell, the inner shell being composed of copper and having its inside surface coated with zinc amalgam and constituting a negative electrode, its outer surface coated with mercury and constituting a positive electrode, the outer shell being also composed of copper and having its inner surface coated with zinc amalgam and constituting a negative electrode, and a lead plate located within the inner shell and constituting a positive electrode.

In testimony, that I claim the foregoing as my invention, I have signed my name in presence of two witnesses, this twenty-first day of December 1912.

RICHARD HURLEY.

Witnesses:
F. GEORGE BARRY,
HENRY C. THIEME.